Nov. 10, 1942.  C. E. PHILLIPS ET AL  2,301,320

WELDING ELECTRODE

Filed Feb. 12, 1940

INVENTORS
CHARLES E. PHILLIPS
HARRY R. PENNINGTON
BY Whittemore Hulbert &Belknap
ATTORNEYS Patented Nov. 10, 1942

2,301,320

UNITED STATES PATENT OFFICE 2,301,320

WELDING ELECTRODE

Charles E. Phillips and Harry R. Pennington, Detroit, Mich., assignors to C. E. Phillips and Company, Detroit, Mich., a corporation of Michigan Application February 12, 1940, Serial No. 318,616

8 Claims. (Cl. 219—8)

The invention relates to welding electrodes.

One of the objects of the invention is to provide an improved welding electrode which is adapted for the welding of both ferrous and non-ferrous material.

Another object of the invention is to provide a welding electrode which is adapted particularly for the welding of cast iron to thereby obtain a welded article which not only has high strength but is also readily machinable at the line of fusion.

Another object of the invention is to provide a welding electrode which can be produced at lower costs than electrodes of the prior art which have been utilized for similar purposes.

A further object of the invention is to produce a composite electrode using two or more metals in the pure state, substantially free from impurities and positioned with respect to one another in such a manner and in such relative amounts as to produce a predetermined alloy in the line of fusion.

Another object of the invention is to provide a welding electrode adapted particularly for arc welding in which a core of one metal is surrounded by a sheath of another metal, which metals are present in amounts to give a desired alloy, and the outer sheath is in turn provided with a flux coating of a suitable composition to insure arc stabilization and to otherwise provide for good welding conditions.

A further object is to obtain a welding electrode adapted for the welding of Monel metal.

These and other objects of the invention are obtained by the constructions hereinafter more fully described and illustrated in the accompanying drawing, wherein Figure 1 is a side view of a welding electrode;

Figure 1:
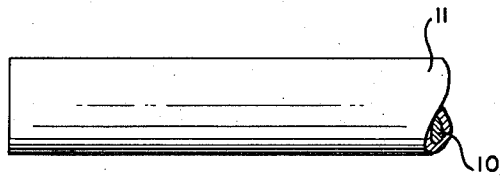
Figure 2:
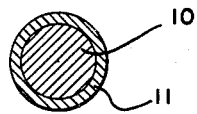
Figure 2 is a cross section thereof.

As shown in Figures 1 and 2, there is a rod 10 f nickel forming a core around which is a sheath r wrapper 11 of copper. The wrapper may be mechanically disposed around the core or, alternatively, it may be cast into place or applied by an electroplating process. The ratio of the metals in the core and the sheath is predetermined to give an alloy of nickel and copper of the desired composition, depending upon the composition of the material to be welded. For example, the welding electrode is to be used for welding objects made of Monel metal, a desirable ratio is 70% nickel and 30% copper.

In the broader aspects of the invention, the relative amounts of nickel and copper may be varied within wide ranges from 10% nickel and 90% copper to 10% copper and 90% nickel.

Figure 3:
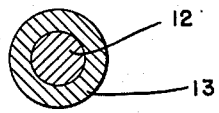
Figure 3 is a cross section of a modified form f the invention.

In Figure 3 we have illustrated a modified form of electrode in which the core 12 is of copper and the sheath 13 is of nickel. The ratio of the two metals may again be varied within the limits given above.

A bimetal welding electrode of the types illustrated in Figures 2 and 3 may be used in such fusion welding purposes as oxy-acetylene carbon arc, atomic hydrogen welding, in which instances if a fluxing agent is required it may be introduced by the methods previously known such as applying flux to the seam or by dipping the end of the heated electrode into a fluxing agent. One of the important advantages of the type of electrode illustrated in Figures 2 and 3 is that it enables the production of a weld deposit having the desired copper-nickel content which is substantially free of other impurities. This is due to the fact that both the copper and the nickel may be commercially obtained in a very pure state, and the amounts of these metals in any given case may be proportioned to give an alloy in the weld deposit of the exact analysis desired.

Figure 4:
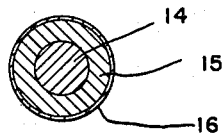
Figure 4 is a cross section of another modified onstruction.

A very important use for our improved electrode is for metallic arc welding. In such instances it is preferable to provide the electrode with an outer flux coating. Thus as shown in Figure 4, 14 is the inner core of nickel or copper, 15 is the surrounding layer of the other of said metals, and 16 is a super-imposed flux coating. While this flux coating may be composed of compositions known in the prior art, we have found that better results are obtained when using a coating comprising the ingredients hereinafter enumerated:

1. An alkaline earth metal carbonate such as calcium carbonate.
2. An alloy of iron, manganese and titanium, preferably obtained as a mixture of ferrotitanium and ferromanganese.
3. Aluminum.
4. Carbon.
5. Binder such as sodium silicate.

In preparing the coating, the first four materials enumerated above are preferably obtained in a powdered form and are then thoroughly mixed with a suitable binder, which preferably is a mineral adhesive solution such as sodium or potassium silicate. The mixture may then be applied to the outer surface of the electrode as indicated at 16 where it will set into a hardened coating. As a specific example of a suitable flux coating, the following materials may be combined in the proportions given:

|  | Parts by weight |
|---|---|
| Calcium carbonate | 10 |
| Ferromanganese titanium | 1 to 1½ |
| Aluminum | 2 |
| Carbon | 1½ |
| Sodium silicate (liquid) | 5 to 5.333 |

A welding electrode, as shown in Figure 4, is of great importance in the welding of cast iron by the arc welding process. A desirable ratio of the copper and nickel for welding cast iron is 70% nickel and 30% copper. Good results are also obtained with a ratio of 80% nickel and 20% copper. It has been found that with an electrode constructed as described there is a better arc action and the metals are more evenly deposited than with electrodes of the prior art. This may be due to the fact that the separate layers of nickel and copper have a better influence on the arc than would an alloy of copper and nickel. The copper is in the nature of a good conductor, whereas the nickel provides a higher electrical resistance. It is found that when the electrode of Figure 4 is used for welding cast iron, the alloy deposited at the point of fusion is readily machinable, whereas with some of the electrodes of the prior art the deposited material is too hard due to the presence of carbides or other alloys formed. With our construction, the alloy consists substantially entirely of copper and nickel, since there are no other impurities present in the electrode by means of which other undesirable ingredients may be included.

While in the preceding description we have referred to the use of our new electrodes for the welding of cast iron and copper-nickel alloys such as Monel metal, it is to be understood that our invention is not limited to these particular uses but is applicable also to other forms of welding.

What we claim as our invention is:

1. A welding electrode comprising a core of nickel and a surrounding coating of copper.

2. A welding electrode comprising a core of one metal and a surrounding coating of another metal, one of said metals being nickel and the other copper, the ratio of the metals being from 10% to 90% nickel and 10% to 90% copper and an outer flux coating.

3. A welding electrode comprising a core of one metal and a surrounding coating of another metal, one of said metals being nickel and the other copper, the amount of copper being on the order of 20% to 30% of the combined metals.

4. A welding electrode comprising a core of one metal and a surrounding coating of another metal, one of said metals being nickel and the other copper, and an outer flux coating comprising calcium carbonate 10 parts, ferromanganese titanium 1 to 1½ parts, aluminum 2 parts, carbon 1½ parts and sodium silicate 5 to 5⅓ parts.

5. A welding electrode comprising a core of nickel and a surrounding coating of copper, the amount of copper being on the order of 20% to 30% of the combined metals.

6. A welding electrode comprising a core of nickel, a surrounding coating of copper, the amount of copper being on the order of 20% to 30% of the combined metals, and an outer flux coating comprising calcium carbonate 10 parts, ferromanganese titanium 1 to 1½ parts, aluminum 2 parts, carbon 1½ parts and sodium silicate 5 to 5⅓ parts.

7. A welding electrode comprising a core of copper and a surrounding coating of nickel, the amount of copper being from 10 to 90% of the combined metals.

8. A welding electrode comprising a core of copper and a surrounding coating of nickel, the amount of copper being on the order of 20 to 30% of the combined metals.

CHARLES E. PHILLIPS.
HARRY R. PENNINGTON.